United States Patent [19]

McShane et al.

[11] Patent Number: 5,613,690

[45] Date of Patent: Mar. 25, 1997

[54] BALANCE AND PROPRIOCEPTION TRAINING AND ENHANCEMENT DEVICES

[76] Inventors: Jerry M. McShane, 2313 Killarney, Deer Park, Tex. 77536; Mrugesh M. Shah, 4301 Vista Rd., Pasadena, Tex. 77505

[21] Appl. No.: 600,360

[22] Filed: Feb. 13, 1996

[51] Int. Cl.⁶ .................................................. A63B 22/16
[52] U.S. Cl. .............................. 273/449; 428/8; 428/146; 428/902
[58] Field of Search ............................. 273/449; 482/8, 482/9, 146, 901, 902

[56] References Cited

U.S. PATENT DOCUMENTS

| | | | |
|---|---|---|---|
| 478,166 | 7/1892 | Madsen | 482/146 |
| 1,565,484 | 12/1925 | McWhirter | 482/146 |
| 3,352,559 | 11/1967 | Larsen | 482/146 X |
| 3,604,726 | 9/1971 | Tracy | 482/146 X |
| 3,835,464 | 9/1974 | Rider . | |
| 4,121,488 | 10/1978 | Akiyama . | |
| 4,538,476 | 9/1985 | Luque . | |
| 4,693,476 | 9/1987 | Talamantez, Sr. . | |
| 4,817,950 | 4/1989 | Goo . | |
| 4,850,588 | 7/1989 | Desjardins et al. | 482/146 X |
| 5,009,419 | 4/1991 | Streeter . | |
| 5,112,045 | 5/1992 | Mason et al. | 482/146 X |

FOREIGN PATENT DOCUMENTS

| | | | |
|---|---|---|---|
| 2410486 | 6/1979 | France | 482/146 |
| 227571 | 10/1910 | Germany | 482/146 |
| 1636001 | 3/1991 | U.S.S.R. | 482/146 |
| 1372342 | 10/1974 | United Kingdom | 482/146 |
| 2004190 | 3/1979 | United Kingdom | 482/146 |
| 8604250 | 7/1986 | WIPO | 482/146 |

Primary Examiner—Paul E. Shapiro
Attorney, Agent, or Firm—Richard C. Litman

[57] ABSTRACT

Various embodiments of balance and proprioception training and enhancement devices, which serve to improve the balance and proprioceptive abilities of a user thereof. A balance platform is placed atop a base platform, with the balance platform being angularly displaceable in any direction relative to the base platform and having a low friction interface between the base platform and the balance platform. The base platform may have either a spherically shaped convex support or a spherically shaped concave depression, with the balance platform having the complementary configuration to the base platform. The low friction interface between the two curved surfaces may comprise low friction coatings or rollers. Angular displacement sensors (rheostats, optical sensors, etc.) are installed to determine the displacement of the balance platform in any direction relative to the base platform, with the sensors linked to a personal computer or the like and providing a display of the angular displacement for the user, through a suitable program. Resistance and angular displacement limits may be provided between the two platforms, if desired. In one embodiment, the balance platform rests atop a narrow central column, which may be adjustable in height to provide adjustment for the angular limits of the device.

20 Claims, 3 Drawing Sheets

BALANCE AND PROPRIOCEPTION TRAINING AND ENHANCEMENT DEVICES

BACKGROUND OF THE INVENTION

1. Field of the Invention

The present invention relates generally to mechanical and electronic devices used in physical training, and more specifically to various embodiments of devices providing for the training and enhancement of balance and proprioception in athletes and others. The devices require a person to balance atop an unstable platform, with the platform being electronically connected to feedback means enabling the user to determine his or her ability readily. The devices may include dampers, limiting means, and variable resistance means, which generally provide for adjustment for different levels of skill.

2. Description of the Prior Art

Various relatively simple yet challenging devices requiring balance and coordination have been developed in the past, generally along the lines of the teeter board or the like, wherein a flat board is placed upon a cylindrical roller and the user attempts to stand on the board and maintain the board in as close to a level position as possible. While such a device is definitely capable of improving one's balance and proprioception with practice, no feedback or quantification of the results is provided.

On the other hand, various spherical or roller type devices have been developed which include electronic means communicating with some form of feedback (e.g., computer monitor) to enable a person to position a cursor or the like accurately on a screen. Such devices are relatively small and light, and in any case generally fail to provide any indication of the tilt of the unit from the horizontal, which function is a requirement of the present invention. While at least one game has been developed which provides electronic feedback or indication of balance, there is no further similarity between such a game and the balance and proprioception training and enhancement devices of the present invention. The various differences and distinctions between the present invention and the prior art of which the inventors are aware, are discussed in detail immediately below.

U.S. Pat. No. 3,835,464 issued to Ronaki E. Rider on Sep. 10, 1974 describes a Position Indicator For A Display System, comprising a sphere which is adapted to roll over an underlying surface and a generally hemispherical shell thereover. The shell includes at least a pair of orthogonally disposed potentiometers connected to wheels which bear against the sphere, which provide variable voltage signals to drive a cursor or the like on a screen. The device is essentially a precursor of the well known computer "mouse." While the device provides output relating to Cartesian coordinates, no means is provided for the determination of angular tilt relative to the horizontal in any direction, as provided by the present invention.

U.S. Pat. No. 4,121,488 issued to Kakunosuke Akiyama on Oct. 24, 1978 describes a Step-On Type Tone Scale Play Device, comprising a pad containing a plurality of membrane type contact switches therein which correspond to the musical scale. The switches are connected to an audio frequency generating device, which provides the corresponding tone when a specific one(s) of the contact switches are closed. The only similarity of the device to the present invention is the provision of a surface for the user to stand upon. No means is provided for the user to tilt the pad or mat surface from the horizontal, nor to determine the tilt of the mat from the horizontal should such action occur, nor to provide any visual feedback of such tilt or any other phenomenon.

U.S. Pat. No. 4,538,476 issued to Tom R. Luque on Sep. 3, 1985 describes a Cursor Control Assembly Having a rotatable sphere which is secured within a fixed base. Two rotating traction wheels driving the sensor means are positioned orthogonally and substantially at the equator of the ball, with a third support wheel positioned opposite the two sensor wheels, substantially equidistant between the two and slightly below the equator. This arrangement provides support of the sphere using only three points. However, such an arrangement is not suitable for use in the present invention, where all support must be well away from the equator of the spherical shapes used, in order to permit sufficient room for significant tilt from the horizontal. Moreover, the three points provided by Luque are not equally spaced from one another, and cannot provide the uniform support required in the present device.

U.S. Pat. No. 4,693,476 issued to Rudolph Talamantez, Sr. on Sep. 15, 1987 describes a Ball-And-Target Game With Tiltable Playing Surface Therefor, wherein a ball is placed loosely between a pair of parallel flat surfaces. A goal with a series of contact switches thereon is centered between the two surfaces. The object is for the player to tilt the game board to remotely cause the ball to trip the contact switches to run up a score. The two surfaces between which the ball is captured are fixed relative to one another, unlike the present device, and the ball is free to move, unlike the fixed substantially hemispherical shapes acting as central pivots in the embodiments of the present device.

U.S. Pat. No. 4,817,950 issued to Paul E. Goo on Apr. 4, 1989 describes a Video Game Control Unit And Attitude Sensor, comprising a surfboard mounted on an inverted hemispherical support. The Support includes a pneumatic toroidal shape (inner tube or the like) therearound to damp movement. An attitude sensing switch is enclosed within the hemisphere, to provide signals when the board, hemisphere, and switch are tilted. However, the switch means is purely binary, either on or off, and only four orthogonally placed contacts are provided. The present training device is adapted to provide fine feedback by video means of the degree of tilt in any direction by means of infinitely variable rheostat switches or other switch means capable of detecting infinitesimal changes, thus enabling the user to incrementally control a cursor on a monitor screen, rather than the off/on switch format of the Goo surfboard simulator.

Finally, U.S. Pat. No. 5,009,419 issued to Willie L. Streeter on Apr. 23, 1991 describes a Microcomputer Controlled Rotation Game comprising a plurality of hand and foot operated pressure switches installed within a fixed base. The switches are manipulated by the player of the game in accordance with any one of several variations, either against another player or against randomly generated indications of the game itself. The object is to repeat specific patterns or orders of switch actuation, or to devise patterns or orders and require another player to duplicate them. No tilt means or attitude variation is provided, and the switches are strictly binary in nature, rather than providing infinitesimal incremental indications, as in the present device.

None of the above inventions and patents, taken either singly or in combination, is seen to describe the instant invention as claimed.

SUMMARY OF THE INVENTION

Accordingly, it is a principal object of the invention to provide improved balance and proprioception training and enhancement devices which comprise various embodiments of hemispherically mounted platforms adapted to tilt angularly and omnidirectionally, and including feedback means providing an indication for the user of the present device of any incremental angular displacement from the horizontal in any direction as the user balances on the platform.

It is another object of the invention to provide improved training devices which hemispherical components may be either upwardly or downwardly concave or convex.

It is a further object of the invention to provide improved training devices which feedback means comprises a personal computer or the like, with software providing a representation of a target on a monitor screen and angular displacement of the training device represented by a linear displacement from the target center in the appropriate direction.

An additional object of the invention is to provide improved training devices which may include electromechanical, optical, or other angular displacement detection means, all of which means provide for the detection of incremental changes in angular displacement from the horizontal in at least two mutually orthogonal directions.

Still another object of the invention is to provide improved training devices which may include stop means to limit the maximum angular displacement, and/or resistance means to slow the motion of any angular displacement which may occur.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
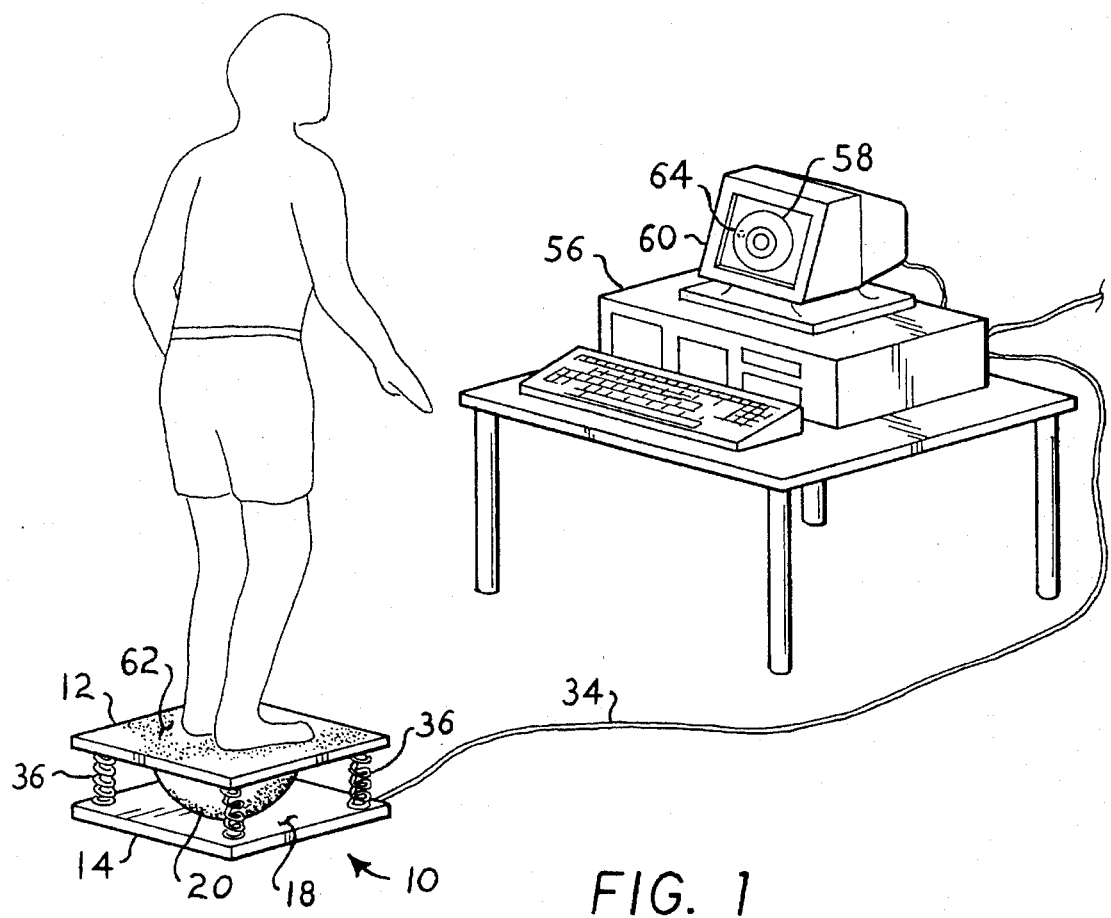
FIG. 1 is a perspective view of one embodiment of the present invention in use, showing a user of the device balancing thereon with video feedback means providing an indication of displacement from the horizontal for the platform.
Figure 3:
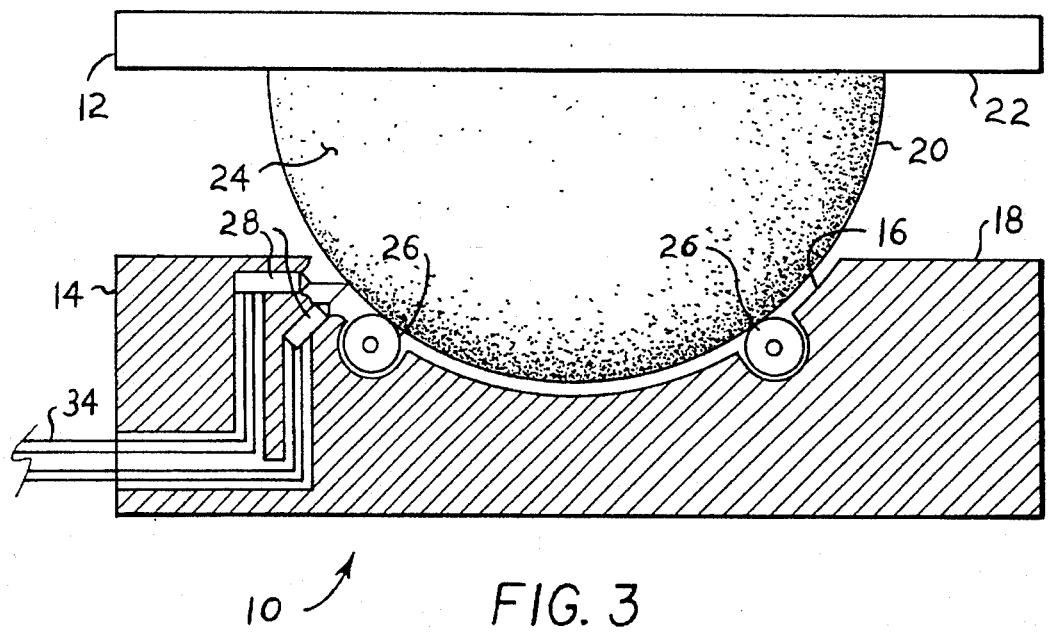
FIG. 3 is an elevation view in partial section of a third embodiment of the present invention, in which a base platform is provided with a concave hemispherical shape and with optical angular displacement detection means disposed in the base.

The present invention comprises various embodiments of a balance and proprioception training and enhancement device, with which a user may train and develop increased balance and proprioceptive abilities. FIGS. 1 and 3 respectively provide general and detail views of one embodiment of the device, generally comprising a base platform and balance platform assembly 10. The assembly is configured to allow the balance platform 12 to rock or angularly tilt relative to the plane of the base platform 14, in any direction, with a user of the device standing atop the balance platform 12 and attempting to maintain the balance platform 12 in a precisely level state relative to the base platform 14.

In the embodiment of FIGS. 1 and 3, the base platform 14 includes a spherically shaped concave depression 16 formed in the upper surface 18 thereof (shown more clearly in FIG. 3), with the balance platform 12 having a spherically shaped convex support 20 extending downwardly from the lower surface 22 thereof. The base platform 14 of FIG. 1 is shown relatively thin, in order to show more clearly the spherical convex configuration of the support 20 extending downwardly from below the balance platform 12. It should also be noted that the spherically concave and convex shapes used in the present invention, comprise only partial spheres, and may comprise somewhat more or less than an exact hemispherical configuration. In any case, it is important that the concave spherical forms be sized so the complementary convex supports fit closely therein, with a minimum of play therebetween.

Figure 4:
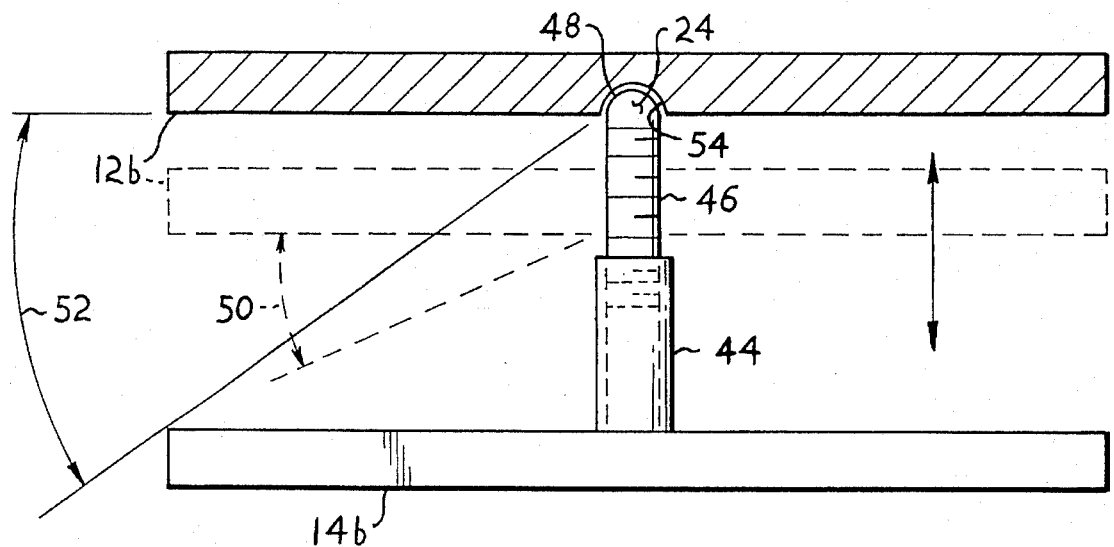
FIG. 4 is an elevation view in partial section of a fourth embodiment of the present invention, in which the balance platform is supported atop a vertically adjustable column, with the height of the column serving to limit the angular displacement of the balance platform thereon.

In each of the embodiments of the present invention, it is important that the convex spherical support be able to move freely within the complementary concave spherical depression of the adjacent platform component. This may be accomplished by forming/covering both the convex and concave components of/with some low friction plastic material (e.g., Teflon; tm, Nylon; tm, etc.), providing the two surfaces with a coating 24 of such low friction material to act as a support or bearing means between the two components (indicated generally in FIG. 3), or even a coating 24 of some lubricant (grease, oil, etc.) as indicated in the embodiment of FIG. 4.

Alternatively, the support means may comprise pairs of roller or bearing wheels 26 disposed in the base component, with the circumference of the wheels 26 extending slightly therefrom and between the two components to bear against and support the overlying structure. Due to the spherical nature of the complementary overlying and underlying structures, it is important that the overlying structure (either convex or concave) be supported at at least three points when roller bearing support means is used. At least two of these support wheels may provide double duty as a position detection device, as shown in the elevation view in section in FIG. 2, and discussed further below. In any case, as preferably two position sensing means are disposed orthogonally within the structure in order to provide detection of angular displacement in two orthogonal axes, two additional orthogonally disposed support rollers may also be provided in order to provide four points of support for the overlying structure.

A key feature of the present invention in its various embodiments, is the measurement of angular displacement of the upper balance platform relative to the plane of the lower base platform. In FIGS. 1 and 3, this is accomplished by means of optical sensor pairs 28 (visual light, infrared, etc.), one of which projects a signal onto the overlying component and the other of which receives the projected signal. By providing different shading gradients between the portion of the structure adjacent the lower surface 22 of the overlying balance platform 12 and the centermost portion, such optical sensors detect the differences in shading, and thus the differences in angular positioning, of the support structure, e.g., convex support 20, and the underlying base. As noted above, two generally orthogonally disposed such sensor pairs 28 are required, in order to provide for detection of angular displacement in two orthogonal axes.

Figure 2:
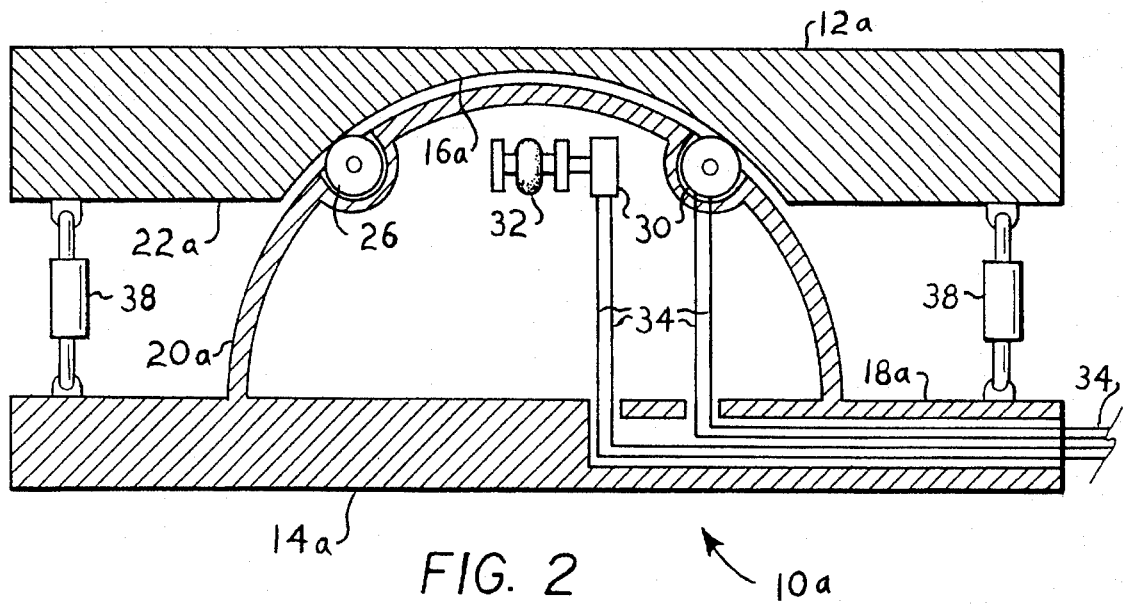
FIG. 2 is an elevation view in section of a second embodiment of the present invention, wherein the balance platform is placed upon an upwardly convex hemisphere, with the hemisphere including balance platform support means, angular displacement detection means, with stop and limit means disposed between the balance platform and base.

Alternatively, some electromechanical means may be used, as in the rheostat assemblies 30 of FIG. 2. Such rheostat assemblies 30 may be operated by a rheostat roller or wheel 32, which bears against the overlying surface through a slot or other passage, in the manner of the support rollers 26 discussed further above. The angular displacement of the overlying structure causes the rheostat wheel(s) 32 to turn, thus varying the electrical resistance of the corresponding rheostat(s) 30 to provide a signal indicating the angular displacement of the overlying structure, including the balance platform. The signals are transmitted for processing by means of signal lines 34.

To this point, only the embodiment including a concave hemispherical depression in the base platform and a cooperating convex hemispherical support below the upper balance platform has been discussed, with it being noted that the various support means and angular displacement detection means shown in the drawing figures for other embodiments may also be included in the first embodiment of FIGS. 1 and 3 discussed above. However, it will be noted that the concave and convex portions of the invention may be reversed, as shown in the embodiment 10a of FIG. 2, with the balance platform 12a including a concave hemispherical depression 16a formed in the lower surface 22a thereof, and the underlying base platform 14a having the convex hemispherical support 20a extending upwardly from the upper surface 18a thereof. It will be seen that either of the two embodiments disclosed in FIGS. 1 through 3 may incorporate low friction means, angular displacement detection means, and other features disclosed in each of the two embodiments.

In many instances, it may be desirable to provide some resistance to the angular deflection of the balance platform relative to the underlying base platform, in order to enable a novice user of the device some additional time to make corrections. This may be accomplished in several different ways, such as the mechanical springs 36 of FIG. 1 or fluid dampers 38 of FIG. 2. (It will be understood that the fluid dampers 28 may comprise either hydraulic or pneumatic devices as desired, according to the desired damping rate or capacity.)

Figure 5:
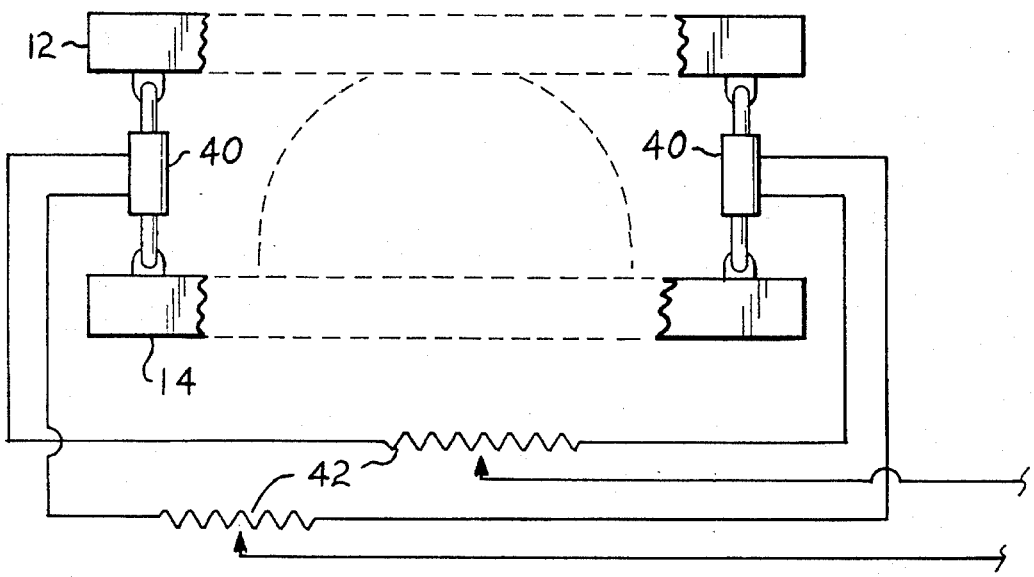
FIG. 5 is a schematic diagram of another type of angular displacement feedback means, which may also comprise angular displacement limit means and resistance means for the balance platform.

Another means of providing such resistance to displacement, as well as simultaneously limiting the maximum displacement, is shown by the electrical schematic drawing of FIG. 5, in which a plurality of linear actuating devices 40 is installed between the two platforms 12 and 14. Such devices 40 may be provided with variable resistance means 42 between opposite pairs, in order to increase or reduce the resistance to angular deflection of the upper balance platform, as desired. The upper output of each actuating device 40 is connected to the lower output of its opposite member, with some variable resistance being placed therebetween. The resistance to displacement may be varied by adjusting this resistance as desired. It will be noted that while electrical actuation of the above described devices 40 is implied, that such devices may be pneumatic or hydraulic struts, and the variable resistance means may comprise adjustable orifices or the like within connecting pneumatic or hydraulic fluid lines.

It is also desirable to provide some maximum limit to the angular displacement in any direction of the upper balance platform of the present invention. This may be achieved naturally by sizing the complementary concave and convex hemispherical shapes, and the width and length of the balance platform, so the edge(s) of the balance platform contact the underlying base platform (or other underlying surface) at the maximum desired angle of tilt of the upper platform. However, such a configuration does not provide any means of adjustment of the maximum tilt angle of the balance platform.

Such may be achieved by adjusting the length of the dampers 38 shown in FIG. 2, or by providing some form of stop means at opposite edges of either the base platform or the balance platform. The actuating devices 40 of FIG. 5 may also act in this capacity, by providing infinite resistance (and thereby stopping motion of the devices) at some point in their extension, in order to preclude extension, and thus angular motion of the balance platform, past that point. such resistance may be by means of an open circuit(s) for electrical control means, or by completely closing a valve(s) for hydraulic devices, etc.

Another means of providing such adjustable limits to the angular deflection of the present balance training device is shown in the embodiment of FIG. 4, wherein the base platform 14b is provided with a generally central base column 44 extending generally vertically upwards therefrom. An upper support column 46 is provided which telescopes within the base column 44, and which is adjustably extendible from the base column 44 to position the hemispherically shaped convex upper tip 48 as desired; the upper or support portion 46 of the column may be threaded into the base column portion 44, as shown, or a plurality of lateral adjustment holes may be provided with a lateral pin passed therethrough to fix the total height of the column components 44/46 as desired. Other means, e.g., spacers placed in the bottom of the base column member 44 to raise the support column portion 46, or other means, may also be provided as desired.

A lower position for the upper balance platform 12b is shown in broken lines in FIG. 4, wherein the upper column member 46 has been adjusted downwardly into the lower column member 44. It will be seen that the lower the balance platform 12b is, the smaller the maximum displacement angle (indicated by the arcuate broken line 50) will be, and conversely, when the upper column member 46 is raised to position the balance platform 12b higher, as shown in solid lines in FIG. 4, the larger the maximum angle (indicated by the arcuate solid line 52) will be. Preferably, the maximum allowable tilt angle for any of the embodiments of the present invention is no greater than 45 degrees, and a maximum angle of 30 degrees is generally suitable for most users of the present device.

As in the case of the other embodiments discussed further above, some means of determining the angular displacement of the upper balance platform 12a of the device of FIG. 4, must be provided. While various of the devices (optical sensors, roller rheostats) discussed above are not readily adaptable to the relatively small tip 48 and corresponding small hemispherical depression 54 of the embodiment of FIG. 4, it will be apparent to those skilled in the art that the actuating means 40 of FIG. 5 may be applied to the embodiment of FIG. 4. Using the motor/generator principle, the linear devices may be used to generate a signal (electric voltage, hydraulic pressure, etc.) which may be measured to determine the angular displacement of the upper balance platform 12b of FIG. 4.

The present balance and proprioception training and enhancement device in its various embodiments, is used by a person to develop better balance and proprioceptive neural pathways in order to adapt more rapidly to changing conditions which may affect one's balance. This is a particularly valuable skill for the serious amateur or professional athlete, but many others may find such training to be advantageous as well. The present device is used generally as indicated in FIG. 1, with the base and balance platform assembly preferably being placed in a clear, level area, and the signal line(s) 34 extended to a personal computer 56 or other device to provide some form of feedback as to the balance platform tilt angle(s). Appropriate software may be loaded into the computer, perhaps displaying a grid or a concentric circular target 58 on the monitor screen 60.

At this point, the person using the device may step upon the upper balance platform (which may be provided with a rubberized or other non-slip coating 62 on its upper surface having a relatively high friction coefficient, for traction) and seek to maintain the upper balance platform 12 in a level position, as evidenced by a cursor 64 or other indication on the screen 60. Appropriate software provides for the movement of the cursor 64 on the screen 60, in accordance with the tilt of the upper balance platform 12 as the user seeks to maintain a perfectly level orientation of the platform 12 with respect to the lower base platform 14.

Numerous variations are possible, such as amplifying the signal to provide a maximum cursor displacement with only a few degrees of tilt in any direction, or perhaps changing the orientation of the platform assembly by 90 or 180 degrees, more or less, to drive the cursor 64 in a different direction than the direction of tilt of the upper platform in order to develop different coordination skills on the part of the user, etc. The tilt of the balance platform over a given period of time may also be recorded by the appropriate software, with records of previous sessions thus being available for review to determine progress and improvement in the proprioceptive capabilities of the user.

In summary, the present device will thus be seen to be of great value to those who wish to improve their balance and proprioceptive skills, particularly those who engage in various physical activities requiring significant balance skills, e.g., bicycling, gymnastics, mountain climbing, etc., but will further be seen to be useful to nearly anyone who needs to further develop such balance skills. The medical profession may find the device useful in testing or improving the skills of persons who have suffered an inner ear problem affecting their balance, as well as in other areas. The present invention provides a significant advance in the field, by enabling interested persons to quantify the development and improvement of such balance skills.

It is to be understood that the present invention is not limited to the sole embodiments described above, but encompasses any and all embodiments within the scope of the following claims.

We claim:

1. A balance and proprioception training and enhancement device, comprising:

a base platform having an upper surface with a spherically shaped concave depression formed therein, and a balance platform disposed thereatop having a lower surface with a spherically shaped convex support extending therebeneath and fitting closely within said spherically concave depression of said base platform;

said concave depression of said base platform and said convex support of said balance platform including support means disposed therebetween providing for low friction movement of said depression and said support relative to one another;

said concave depression further including angular displacement detection means disposed therein and adapted to provide continuous output of incremental angular variation of said balance platform relative to said base platform, in at least two mutually orthogonal directions, whereby;

a user of said training device stands atop said balance platform and attempts to maintain said balance platform in a level orientation relative to said base platform in accordance with said continuous output of incremental angular variation of said balance platform relative to said base platform, thereby enhancing the balance and proprioceptive skills of the user.

2. The balance device according to claim 1, wherein:

said support means comprises a first low friction coating upon said convex support of said balance platform and a second low friction coating within said concave depression of said base platform, with said first coating and said second coating adapted to slidingly engage one another when said convex support is disposed within said concave depression.

3. The balance device according to claim 1, wherein:

said support means comprises a plurality of rollers orthogonally disposed within said concave depression of said base platform and projecting therefrom, to engage said convex support when said convex support is disposed within said concave depression.

4. The balance device according to claim 1, wherein:

said angular displacement detection means is selected from the group consisting of rheostats and optical sensors.

5. The balance device according to claim 1, further comprising resistance means positioned between the base platform and balance platform for providing resistance to angular deflection of the balance platform, and wherein said resistance means is selected from the group consisting of mechanical springs, linear actuators, pneumatic dampers, and hydraulic dampers.

6. The balance device according to claim 1, including:

angular displacement limit means adapted to limit the angular displacement of said balance platform relative to said base platform to a predetermined maximum angle.

7. The balance device according to claim 1, wherein:

said balance platform has an upper surface including a non-skid surface of high friction coefficient disposed at least partially thereover.

8. A balance and proprioception training and enhancement device, comprising:

a base platform having an upper surface with a spherically shaped convex support formed thereon, and a balance platform disposed thereatop having a lower surface with a spherically shaped concave depression formed therein, with said spherically convex support of said base platform fitting closely within said spherically concave depression of said balance platform;

said convex support of said base platform and said concave depression of said balance platform including support means disposed therebetween providing for low friction movement of said depression and said support relative to one another;

said convex support further including angular displacement detection means disposed therein and adapted to provide continuous output of incremental angular variation of said balance platform relative to said base platform, in at least two mutually orthogonal directions, whereby;

a user of said training device stands atop said balance platform and attempts to maintain said balance platform in a level orientation relative to said base platform in accordance with said continuous output of incremental angular variation of said balance platform relative to said base platform, thereby enhancing the balance and proprioceptive skills of the user.

9. The balance device according to claim 8, wherein:

said support means comprises a first low friction coating upon said convex support of said base platform and a second low friction coating within said concave depression of said balance platform, with said first coating and said second coating adapted to slidingly engage one another when said convex support is disposed within said concave depression.

10. The balance device according to claim 8, wherein:

said support means comprises a plurality of rollers orthogonally disposed within said convex support of said base platform and projecting therefrom, to engage said concave depression when said convex support is disposed within said concave depression.

11. The balance device according to claim 8, wherein:

said angular displacement detection means is selected from the group consisting of rheostats and optical sensors.

12. The balance device according to claim 8, further comprising resistance means positioned between the base platform and balance platform for providing resistance to angular deflection of the balance platform, and wherein said resistance means is selected from the group consisting of mechanical springs, linear actuators, pneumatic dampers, and hydraulic dampers.

13. The balance device according to claim 8, including:

angular displacement limit means adapted to limit the angular displacement of said balance platform relative to said base platform to a predetermined maximum angle.

14. The balance device according to claim 8, wherein:

said balance platform has an upper surface including a non-skid surface of high friction coefficient disposed at least partially thereover.

15. A balance and proprioception training and enhancement device, comprising:

a base platform having an upper surface with a column disposed generally centrally thereon and extending generally vertically upwardly therefrom, with said column having a spherically shaped convex upper tip;

a balance platform disposed thereabove having a lower surface with a spherically shaped concave depression formed therebeneath and fitting closely atop said spherically convex tip of said column of said base platform;

said convex tip of said column and said concave depression of said balance platform including support means disposed therebetween providing for low friction movement of said depression and said tip relative to one another;

said base platform and said balance platform further including angular displacement detection means disposed therebetween and adapted to provide continuous output of incremental angular variation of said balance platform relative to said base platform, in at least two mutually orthogonal directions, whereby;

a user of said training device stands atop said balance platform and attempts to maintain said balance platform in a level orientation relative to said base platform in accordance with said continuous output of incremental angular variation of said balance platform relative to said base platform, thereby enhancing the balance and proprioceptive skills of the user.

16. The balance device according to claim 15, wherein:

said support means comprises a first low friction coating upon said convex tip of said column and a second low friction coating within said concave depression of said balance platform, with said first coating and said second coating adapted to slidingly engage one another when said convex tip of said column is disposed within said concave depression.

17. The balance device according to claim 15, wherein:

said angular displacement detection means comprises at least two rheostats.

18. The balance device according to claim 15, further comprising resistance means positioned between the base platform and balance platform for providing resistance to angular deflection of the balance platform, and wherein said resistance means is selected from the group consisting of mechanical springs, linear actuators, pneumatic dampers, and hydraulic dampers.

19. The balance device according to claim 15, wherein:

said column has an adjustable height providing for the adjustment of the angular displacement of said balance platform relative to said base platform to a predetermined maximum angle.

20. The balance device according to claim 15, wherein:

said balance platform has an upper surface including a non-skid surface of high friction coefficient disposed at least partially thereover.

* * * * *